(12) United States Patent
Saruwatari et al.

(10) Patent No.: US 8,568,927 B2
(45) Date of Patent: *Oct. 29, 2013

(54) NONAQUEOUS ELECTROLYTE BATTERY, BATTERY PACK AND VEHICLE

(71) Applicants: Hidesato Saruwatari, Saku (JP);
Hideaki Morishima, Ichikawa (JP);
Hiroki Inagaki, Kawasaki (JP); Norio Takami, Yokohama (JP)

(72) Inventors: Hidesato Saruwatari, Saku (JP);
Hideaki Morishima, Ichikawa (JP);
Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/686,501

(22) Filed: Nov. 27, 2012

(65) Prior Publication Data

US 2013/0084497 A1    Apr. 4, 2013

Related U.S. Application Data

(63) Continuation of application No. 12/047,708, filed on Mar. 13, 2008, now Pat. No. 8,343,667.

(30) Foreign Application Priority Data

Mar. 28, 2007 (JP) ................. 2007-085716

(51) Int. Cl.
*H01M 4/02* (2006.01)
*H01M 4/485* (2010.01)
*H01M 4/131* (2010.01)
*H01M 4/525* (2010.01)
*B60K 1/00* (2006.01)

(52) U.S. Cl.
USPC ............... 429/231.95; 429/231.2; 429/231.3; 429/231.5; 429/209; 180/65.1

(58) Field of Classification Search
USPC ............. 429/231.95, 209, 231.1, 231.5, 245, 429/223, 218.2, 231.3, 231, 2; 180/65.1, 180/65.12
See application file for complete search history.

(56) References Cited

U.S. PATENT DOCUMENTS

| | | | |
|---|---|---|---|
| 6,132,639 A | 10/2000 | Komatsu et al. | |
| 7,662,515 B2 | 2/2010 | Inagaki et al. | |
| 7,811,703 B2 | 10/2010 | Fujita et al. | |
| 8,039,151 B2 | 10/2011 | Inagaki et al. | |
| 2004/0131934 A1 | 7/2004 | Sugnaux et al. | |
| 2007/0009798 A1 | 1/2007 | Inagaki et al. | |
| 2007/0009801 A1 | 1/2007 | Inagaki et al. | |
| 2007/0231690 A1 | 10/2007 | Fujita et al. | |
| 2009/0169997 A1 | 7/2009 | Saruwatari et al. | |

FOREIGN PATENT DOCUMENTS

| | | |
|---|---|---|
| JP | 5-151953 | 6/1993 |
| JP | 2005-158721 A | 6/2005 |
| JP | 2006-59690 | 3/2006 |
| JP | 2007-18882 | 1/2007 |

*Primary Examiner* — Kenneth Douyette
(74) *Attorney, Agent, or Firm* — Oblon, Spivak, McClelland, Maier & Neustadt, L.L.P.

(57) ABSTRACT

A nonaqueous electrolyte battery includes a positive electrode, a negative electrode and a nonaqueous electrolyte. The negative electrode contains a lithium compound and a negative electrode current collector supporting the lithium compound. A log differential intrusion curve obtained when a pore size diameter of the negative electrode is measured by mercury porosimetry has a peak in a pore size diameter range of 0.03 to 0.2 μm and attenuates with a decrease in pore size diameter from an apex of the peak. A specific surface area (excluding a weight of the negative electrode current collector) of pores of the negative electrode found by mercury porosimetry is 6 to 100 m²/g. A ratio of a volume of pores having a pore size diameter of 0.05 μm or less to a total pore volume is 20% or more.

16 Claims, 10 Drawing Sheets

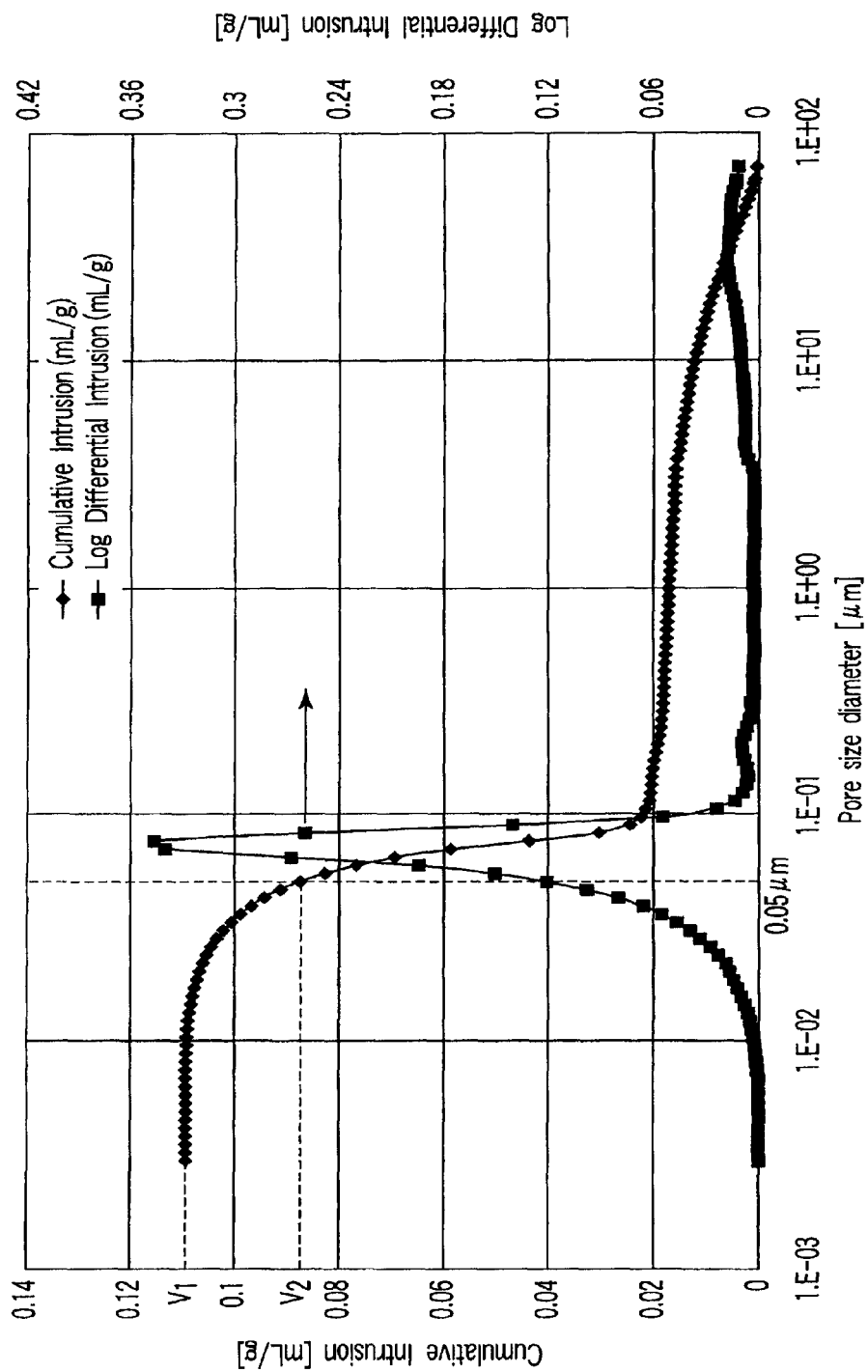
F I G. 1

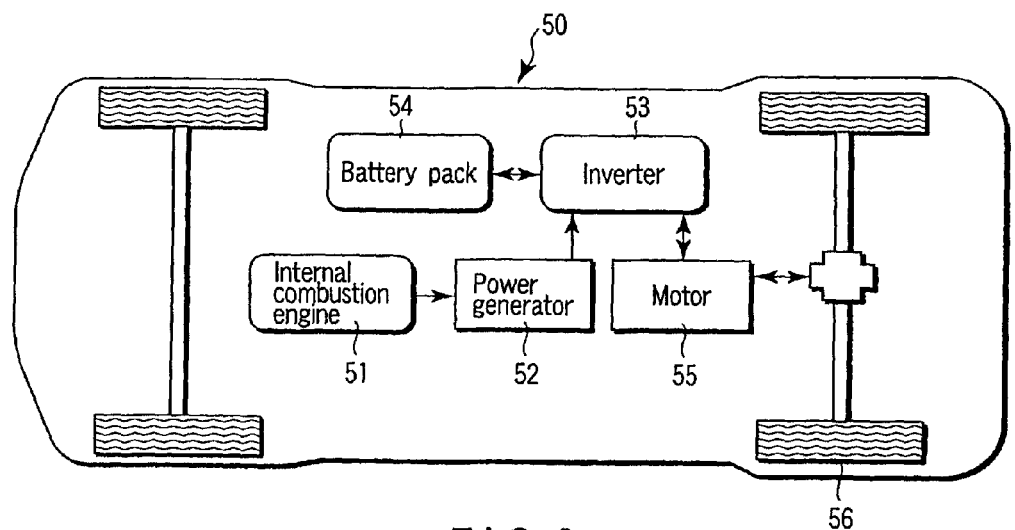
F I G. 9
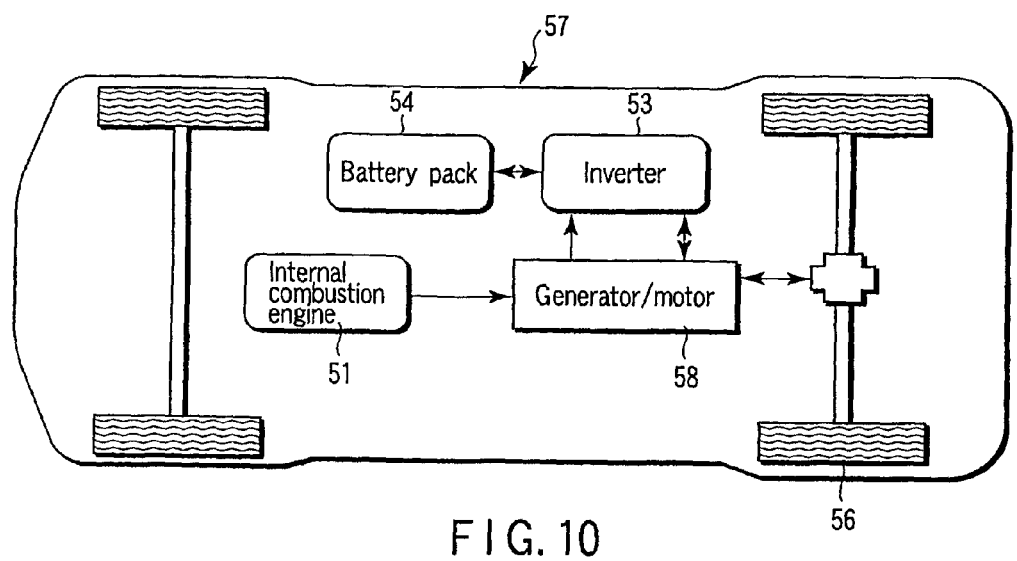
F I G. 10

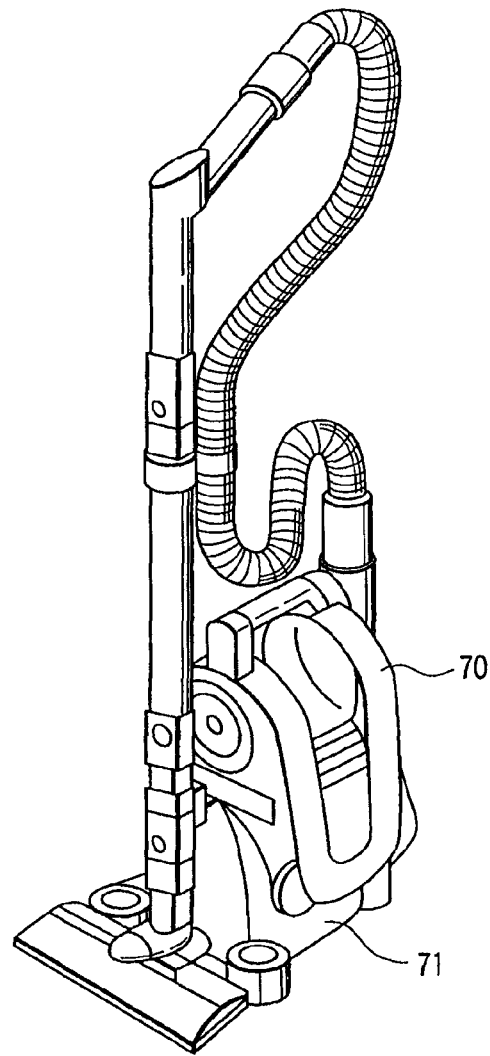
F I G. 15
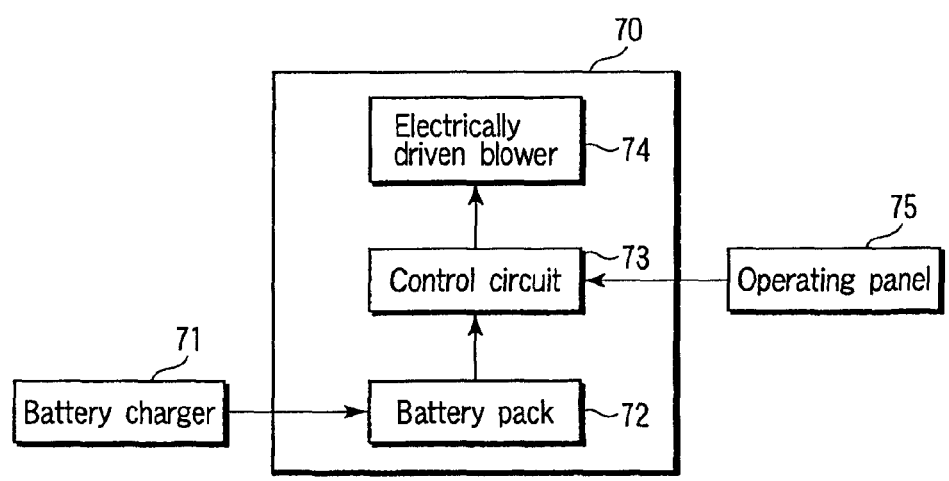
F I G. 16

NONAQUEOUS ELECTROLYTE BATTERY, BATTERY PACK AND VEHICLE

CROSS-REFERENCE TO RELATED APPLICATIONS

The present application is a continuation of, and claims the benefit of priority under 35 U.S.C. §120, from U.S. application Ser. No. 12/047,708, now U.S. Pat. No. 8,343,667, filed Mar. 13, 2008, which claims the benefit of priority under 35 U.S.C. §119, from Japanese Patent Application No. 2007-085716, filed Mar. 28, 2007, the entire contents of both (all) of which are incorporated herein by reference.

BACKGROUND OF THE INVENTION

1. Field of the Invention

The present invention relates to a nonaqueous electrolyte battery, and a battery pack and a vehicle provided with this nonaqueous electrolyte battery.

2. Description of the Related Art

As shown in JP-A 5-151953 (KOKAI) and JP-A 2006-59690 (KOKAI), it is known that an improvement in the performance of a battery can be attained by knowing the state of particles in the battery electrode based on the measurement of the pore distribution of the battery electrode by using mercury porosimetry. In this case, JP-A 5-151953 (KOKAI) relates to an invention using, as the negative electrode active material, a mixture of a metal oxide and an insoluble and infusible base of a polyarene type skeleton structure having a specific surface area of 600 $m^2/g$ or more as measured by a BET method. On the other hand, JP-A 2006-59690 (KOKAI) relates to an invention using, as the negative electrode active material, a composite graphite material having a relatively small specific surface area of 1.5 to 5 $m^2/g$ as measured by a BET method.

When a lithium compound having a small ionic diffusibility in a solid is used as the negative electrode active material, it is difficult to develop a high power battery. However, it is known that high power can be attained by using microparticles of this lithium compound. These microparticles of a lithium compound pose the problem that they cause a large variation in the output characteristics of a battery depending on the production method of the battery, because they have the characteristic that they tend to be coagulated in a process of producing an electrode using these microparticles.

The nonaqueous electrolyte battery described in JP-A 2007-18882 (KOKAI) uses, as the negative electrode active material, lithium compound particles having a lithium ion absorption potential of 0.4V (vs. $Li/Li^+$) or more and an average particle diameter of 1 μm or less. In JP-A 2007-18882 (KOKAI), during the manufacture of a negative electrode, a slurry is stirred strongly in a specified condition to reduce coagulation among lithium compound particles. It is described in JP-A 2007-18882 (KOKAI) that the edges of lithium compound particles are scraped away by this stirring to smooth the surfaces of these particles. JP-A 2007-18882 (KOKAI) also describes that, as a result, these lithium compound particles can be filled at a high density in a negative electrode. Therefore, the pore size diameter distribution is shifted to the smaller pore size diameter side, with the result that a first peak having a mode diameter of 0.01 to 0.2 μm and a second peak having a mode diameter of 0.003 to 0.02 μm appear in the log differential intrusion curve of the negative electrode, as measured using mercury porosimetry. JP-A 2007-18882 (KOKAI) describes that the cycle life of a nonaqueous electrolyte battery is improved by specifying the pore volume in each peak range.

BRIEF SUMMARY OF THE INVENTION

According to a first aspect of the present invention, there is provided a nonaqueous electrolyte battery, comprising:
a positive electrode;
a negative electrode containing a lithium compound and a negative electrode current collector supporting the lithium compound; and
a nonaqueous electrolyte,
wherein a log differential intrusion curve obtained when a pore size diameter of the negative electrode is measured by mercury porosimetry has a peak in a pore size diameter range of 0.03 to 0.2 μm and attenuates with a decrease in pore size diameter from an apex of the peak,
a specific surface area (excluding a weight of the negative electrode current collector) of pores of the negative electrode found by mercury porosimetry is 6 to 100 $m^2/g$, and
a ratio of a volume of pores having a pore size diameter of 0.05 μm or less to a total pore volume is 20% or more.

According to a second aspect of the present invention, there is provided a battery pack comprising a nonaqueous electrolyte battery, the nonaqueous electrolyte battery comprising:
a positive electrode;
a negative electrode containing a lithium compound and a negative electrode current collector supporting the lithium compound; and
a nonaqueous electrolyte,
wherein a log differential intrusion curve obtained when a pore size diameter of the negative electrode is measured by mercury porosimetry has a peak in a pore size diameter range of 0.03 to 0.2 μm and attenuates with a decrease in pore size diameter from an apex of the peak,
a specific surface area (excluding a weight of the negative electrode current collector) of pores of the negative electrode found by mercury porosimetry is 6 to 100 $m^2/g$, and
a ratio of a volume of pores having a pore size diameter of 0.05 μm or less to a total pore volume is 20% or more.

BRIEF DESCRIPTION OF THE SEVERAL VIEWS OF THE DRAWING

FIG. 1 is a characteristic curve showing the pore size diameter distribution of a negative electrode used in a nonaqueous electrolyte battery according to a first embodiment when the pore size diameter distribution is measured using mercury porosimetry;

FIG. 9 is a pattern diagram showing a series hybrid car according to a third embodiment;

FIG. 10 is a pattern diagram showing a parallel hybrid car according to the third embodiment;

FIG. 15 is a pattern diagram showing a rechargeable vacuum cleaner according to a fourth embodiment; and FIG. 16 is a structural view of a rechargeable vacuum cleaner according to FIG. 15.

DETAILED DESCRIPTION OF THE INVENTION

Figure 2:
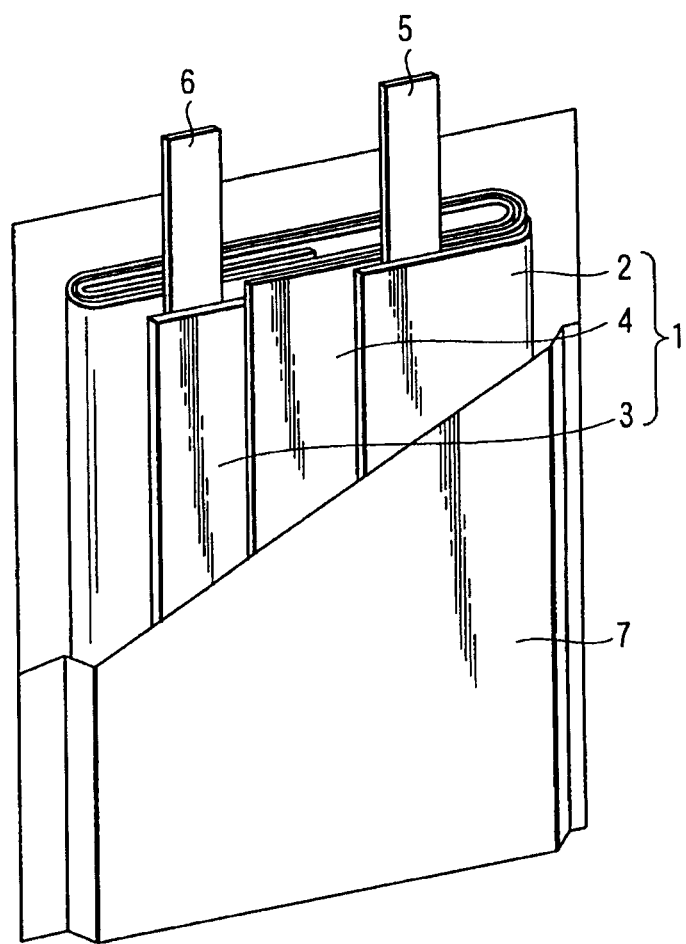
FIG. 2 is a partially broken perspective view showing a nonaqueous electrolyte battery according to the first embodiment.

The inventors of the present invention have made earnest studies to improve the output performance of a nonaqueous electrolyte battery using a lithium compound as the negative electrode active material and as a result, found that a high output performance is obtained when the pore size diameter distribution of the negative electrode as measured using mercury porosimetry satisfies the following conditions (1) to (4).

(1) The log differential intrusion curve of the negative electrode measured using mercury porosimetry has a peak in a pore size diameter range of 0.03 μm to 0.2 μm.

(2) The above log differential intrusion curve attenuates with a decrease in pore size diameter from the apex of the above peak.

(3) The specific surface area of pores measured using the above mercury porosimetry is 6 m$^2$/g or more and 100 m$^2$/g or less. In this case, the weight of the negative electrode which is used to calculate the specific surface area of pores is a value excluding the weight of the negative electrode current collector.

(4) The ratio of the volume of pores having a pore size diameter of 0.05 μm or less to the total pore volume is 20% or more. The above ratio is found by mercury porosimetry.

A negative electrode which satisfies the above condition (3) is superior in nonaqueous electrolyte impregnation ability. It is desirable to use lithium compound particles having a fine particle size to satisfy the above condition (3). However, if the particle size of lithium compound particles is smaller, a flock tends to be produced in a process of producing the negative electrode. A negative electrode which satisfies the above conditions (1), (2) and (4) is reduced not only in the amount of this flock but also in the amount of broken pieces of primary particles of the lithium compound and therefore, the uniformity of the distribution of a negative electrode active material can be improved. Therefore, because the nonaqueous electrolyte impregnation ability of the negative electrode and the uniformity of the distribution of the negative electrode active material can be improved, the DC resistance of the negative electrode is reduced and therefore, the output performance of the nonaqueous electrolyte battery is improved.

FIG. 1 shows an example of a distribution curve of pore volume of the negative electrode which is measured by mercury porosimetry. In FIG. 1, the abscissa is the pore size diameter (radius), the right ordinate is the log differential intrusion and the left ordinate is the cumulative intrusion. The log differential intrusion curve is a curve expressed by the right ordinate to show a variation in the log differential intrusion as a function of the pore size diameter. As shown in FIG. 1, a peak exists in a pore size diameter range of 0.03 μm to 0.2 μm. Also, the curve attenuates with a decrease in pore size diameter from the apex. In other words, no other peak is present at a pore size diameter smaller than the pore size diameter of the apex of the peak. Here, the description "a peak exists in a pore size diameter range of 0.03 μm to 0.2 μm" means that the mode diameter of the peak which is the pore size diameter of the apex of the peak is 0.03 μm or more and 0.2 μm or less. The pore size diameter is more preferably 0.04 μm or more and 0.1 μm or less.

The curve defined by the left ordinate indicates the integrating volume obtained by integrating the volumes of pores having a pore size diameter of 100 μm or less in the direction of a reduction in pore size diameter, that is, a cumulative intrusion. The maximum value $V_1$ of the cumulative intrusion in the cumulative intrusion curve corresponds to the total pore volume of the negative electrode. The volume of pores having pore size diameters of 0.05 μm or less is a difference between the maximum value $V_1$ (total pore volume) of the cumulative intrusion and the cumulative intrusion $V_2$ at a pore size diameter of 0.05 μm. The ratio of the volume of pores having a pore size diameter of 0.05 μm or less to the total pore volume is preferably 20% or more and more preferably 30% or more. Also, the upper limit of the ratio may be designed to be 90%. The reason for this is because if a negative electrode is used which is provided with pores mostly having a small diameter, as in the case where the ratio of pores having a pore size diameter of 0.05 μm or less exceeds 90%, there is a concern that the negative electrode active material detaches from the current collector metal foil because it becomes less resistant to mechanical bending and to expansion and shrinkage thereof during charging and discharging.

If, among the above conditions (1), (2) and (4), any condition is unsatisfied, the negative electrode is greatly deteriorated in output performance because the uniformity in the distribution of a negative electrode active material in the negative electrode is reduced.

Further, the total pore volume is preferably in the range of 0.1 to 0.5 mL/g per 1 g of the negative electrode, excluding the negative electrode current collector. When the total pore volume is less than 0.1 mL/g, there is a concern that a high output performance is not obtained because only an insufficient reaction field is obtained on the surface of the electrode. When the total pore volume is larger than 0.5 mL/g, on the other hand, side reactions other than the battery reaction are easily caused and there is therefore the possibility that a performance obtained when a charge and discharge operation is repeated, that is, a cycle performance is deteriorated. The total pore volume is more preferably in the range of 0.11 mL/g or more and 0.4 mL/g or less.

The negative electrode is porous and comprises a negative electrode current collector and a negative electrode active material-containing layer which is supported on one or both surfaces of the current collector and contains an active material, a binder and as required, a conductor.

As the negative electrode active material, a lithium compound that absorbs and releases lithium ions is preferable. Examples of the lithium compound include lithium oxides, lithium sulfides and lithium nitrides. These compounds include compounds which contain no lithium in an uncharged state but contain lithium when they are charged.

Examples of these oxides include metal oxides containing titanium as the metal component, amorphous tin oxide such as $SnB_{0.4}P_{0.6}O_{3.1}$, tin-silicon oxides such as $SnSiO_3$, silicon oxide such as SiO and tungsten oxides such as $WO_3$. Among these compounds, metal oxides containing titanium as the metal component are preferable.

Examples of the metal oxides containing titanium as the metal component may include lithium-titanium oxides and titanium-based oxides containing no lithium when synthesized. Examples of the lithium-titanium oxides may include lithium titanate having a spinel structure and lithium titanate having a ramsdellite structure. Examples of lithium titanate having a spinel structure may include $Li_{4+x}Ti_5O_{12}$ (x varies in the range: $-1 \leq x \leq 3$, depending on a charge/discharge reaction). Examples of lithium titanate having a ramsdellite structure may include $Li_{2+y}Ti_3O_7$ (y varies in the range: $-1 \leq y \leq 3$, depending on a charge/discharge reaction). Examples of the titanium-based oxides include $TiO_2$ and metal composite oxides containing Ti and at least one element selected from the group consisting of P, V, Sn, Cu, Ni and Fe. $TiO_2$ is preferably of an anatase type that is heat-treated at a temperature of 300 to 500° C. to provide it with low crystallinity. Examples of the metal composite oxides containing Ti and at least one element selected from the group consisting of P, V, Sn, Cu, Ni and Fe may include $TiO_2$—$P_2O_5$, $TiO_2$—$V_2O_5$, $TiO_2$—$P_2O_5$—$SnO_2$ and $TiO_2$—$P_2O_5$-MeO (Me is at least one element selected from the group consisting of Cu, Ni and Fe). This metal composite oxide preferably has low crystallinity and has a microstructure in which a crystal phase and an amorphous phase coexist or an amorphous phase exists independently. When the metal composite oxide has such a microstructure, the cycle performance can be greatly improved. Among these compounds, lithium-titanium oxide and metal composite oxides containing Ti and at least one element selected from the group consisting of P, V, Sn, Cu, Ni and Fe are preferable.

Examples of the sulfides include titanium sulfide such as $TiS_2$, molybdenum sulfide such as $MoS_2$ and iron sulfides such as FeS, $FeS_2$ and $Li_xFeS_2$ ($0<x$).

Examples of the nitrides include lithium-cobalt nitrides (for example, $Li_xCo_yN$, $0<x<4$, $0<y<0.5$).

The negative electrode active material preferably contains at least one type selected from lithium titanate having a spinel structure, such as $Li_{4+x}Ti_5O_{12}$, FeS and $FeS_2$. And the negative electrode active material is most preferably lithium titanate having a spinel structure. Because lithium titanate having a spinel structure has excellent lithium-ion acceptability, a less resistant coating film can be formed on the surface of the negative electrode by specifying initial charge conditions.

Examples of the above conductive agent may include acetylene black, ketjen black, graphite and metal powder.

Examples of the binder include polytetrafluoroethylene (PTFE), polyvinylidene fluoride (PVdF), fluorine rubbers and styrene butadiene rubber.

The compounding ratio of the above negative electrode active material, conductive agent and binder is preferably as follows: the negative electrode active material: 80 to 98% by weight, the conductive agent: 0 to 20% by weight and the binder: 2 to 7% by weight.

It is desirable for the current collector of the negative electrode to be formed of aluminum foil or aluminum alloy foil. It is also desirable for the current collector to have an average crystal grain size not larger than 50 μm. In this case, the mechanical strength of the current collector can be drastically increased so as to make it possible to increase the density of the negative electrode by applying the pressing under a high pressure to the negative electrode. As a result, the battery capacity can be increased. Also, since it is possible to prevent the dissolution and corrosion deterioration of the current collector in an over-discharge cycle under an environment of a high temperature not lower than, for example, 40° C., it is possible to suppress the elevation in the impedance of the negative electrode. Further, it is possible to improve the output performance, the rapid charging performance, and the charge-discharge cycle performance of the battery. It is more desirable for the average crystal grain size of the current collector to be not larger than 30 μm, furthermore desirably, not larger than 5 μm.

The average crystal grain size can be obtained as follows. Specifically, the texture of the current collector surface is observed with an electron microscope so as to obtain the number n of crystal grains present within an area of 1 mm×1 mm. Then, the average crystal grain area S is obtained from the formula "$S=1 \times 10^6/n$ (μm$^2$)", where n denotes the number of crystal grains noted above. Further, the average crystal grain size d (μm) is calculated from the area S by formula (A) given below:

$$d=2(S/\pi)^{1/2} \quad (A)$$

The average crystal grain size of the aluminum foil or the aluminum alloy foil can be complicatedly affected by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 50 μm, more desirably not larger than 25 μm. Also, it is desirable for the aluminum foil to have a purity not lower than 99%. It is desirable for the aluminum alloy to contain another element such as magnesium, zinc or silicon. On the other hand, it is desirable for the amount of the transition metal such as iron, copper, nickel and chromium contained in the aluminum alloy to be not larger than 1%.

A production method of the negative electrode will be explained. This negative electrode is manufactured by suspending the negative electrode active material, conductive agent and binder in an appropriate solvent and by applying this suspension to the current collector, followed by drying and pressing to make a band-shaped material. The process of preparing the suspension is important. In a so-called kneading step in which the suspension is mixed in the condition of a low solvent ratio, the temperature is set to 5 to 10° C. during kneading to carry out this kneading process under a small shearing force for a time as long as 12 hours to 18 hours, whereby finer flocks are sufficiently pulverized. Moreover, the obtained suspension is circulated for 10 to 90 minutes by using a beads mill with a vessel having a capacity of A [L] at a flow rate of A to 10 A [L/min] to make a suspension free from any flock. At this time, the diameter of the beads is preferably 0.01 mmφ or more and 0.45 mmφ or less. When the suspension as the product to be treated is made to pass through the beads mill using small-diameter beads at a large flow rate, that is, when the retention time during which the suspension is made to pass one time through the vessel imparting a small impact is shortened, only a soft shearing force is applied to the suspension, making it possible to loosen the coagulation of primary particles without any influence on the shape and crystallinity of the negative electrode active material. When the diameter of the beads is larger than 0.45 mmφ, there is a concern that too much energy is applied to the suspension when the suspension is circulated through the beads mill, causing easy coagulation among particles in the suspension, on the contrary. Then, the suspension free from any flock is applied and dried, whereby a negative electrode that satisfies the above conditions (1) to (4) can be produced.

The positive electrode and nonaqueous electrolyte to be used in the nonaqueous electrolyte battery will be explained.

1) Positive Electrode

The positive electrode comprises a positive electrode current collector and a positive electrode active material-containing layer which is supported on one or both surfaces of the positive electrode current collector and containing an active material, a conductive agent and a binder.

This positive electrode is manufactured by adding the conductive agent and the binder to the positive electrode active material, suspending the mixture in an appropriate solvent and applying the suspension to a current collector such as an aluminum foil, followed by drying and pressing to make a band-shaped material.

Examples of the above positive electrode active material include various oxides and sulfides. Specific examples of the positive electrode active material include manganese dioxide ($MnO_2$), iron oxide, copper oxide, nickel oxide, lithium-manganese composite oxide such as $Li_xMn_2O_4$ or $Li_xMnO_2$, lithium-nickel composite oxide such as $Li_xNiO_2$, lithium-cobalt composite oxide such as $Li_xCoO_2$, lithium-nickel-cobalt composite oxide, lithium-manganese-cobalt composite oxide, lithium-manganese-nickel composite oxide, spinel-type lithium-manganese-nickel composite oxide such as $Li_xMn_{2-y}Ni_yO_4$, lithium phosphates having an olivine structure, iron sulfate such as $Fe_2(SO_4)_3$ and vanadium oxide such as $V_2O_5$.

Examples of the lithium-nickel-cobalt composite oxides include $LiNi_{1-y-z}Co_yM_zO_2$ (M is at least one element selected from the group consisting of Al, Cr and Fe, $0 \leq y \leq 0.5$ and $0 \leq z \leq 0.1$). Examples of the lithium-manganese-cobalt composite oxides include $LiMn_{1-y-z}Co_yM_zO_2$ (M is at least one element selected from the group consisting of Al, Cr and Fe, $0 \leq y \leq 0.5$ and $0 \leq z \leq 0.1$). Examples of the lithium-manganese-nickel composite oxides include $LiMn_xNi_xM_{1-2x}O_2$ (M is at least one element selected from the group consisting of Co, Cr Al and Fe, $\frac{1}{3} \leq x \leq \frac{1}{2}$). Examples of the oxides represented by $LiMn_xNi_xM_{1-2x}O_2$ include $LiMn_{1/3}Ni_{1/3}Co_{1/3}O_2$ and $LiMn_{1/2}Ni_{1/2}O_2$. Examples of lithium phosphates having an olivine structure include $Li_xFePO_4$, $Li_xFe_{1-y}Mn_yPO_4$ and $Li_xCoPO_4$.

Also, organic materials and inorganic materials including conductive polymer materials such as polyaniline and polypyrrole, disulfide type polymer materials, sulfur (S) and carbon fluoride may be used.

In this case, x, y and z the preferable ranges of which are not described above are respectively in the range of 0 to 1.

More preferable examples of the material used for the positive electrode of secondary batteries include lithium-manganese composite oxides, lithium-nickel composite oxides, lithium-cobalt composite oxides, lithium-nickel-cobalt composite oxides, lithium-manganese-nickel composite oxides, spinel type lithium-manganese-nickel composite oxides, lithium-manganese-cobalt composite oxides and lithium-iron-phosphates. These positive electrodes ensure a high battery voltage.

Examples of the above conductive agent may include acetylene black, ketjen black, graphite and cokes.

Examples of the above binder include polytetrafluoroethylene (PTFE), polyvinylidene fluoride (PVdF) and fluorine-type rubbers.

The compounding ratio of the above positive electrode active material, conductive agent and binder is preferably as follows: the positive electrode active material: 80 to 95% by weight, the conductive agent: 3 to 20% by weight and the binder: 2 to 7% by weight.

It is desirable for the current collector to be formed of an aluminum foil or an aluminum alloy foil. It is desirable for the aluminum foil or the aluminum alloy foil forming the current collector to have an average crystal grain size not larger than 50 μm. It is more desirable for the average crystal grain size noted above to be not larger than 30 μm, and furthermore desirably not larger than 5 μm. Where the average crystal grain size of the aluminum foil or the aluminum alloy foil forming the current collector is not larger than 50 μm, the mechanical strength of the aluminum foil or the aluminum alloy foil can be drastically increased to make it possible to press the positive electrode with a high pressure. It follows that the density of the positive electrode can be increased to increase the battery capacity.

It is desirable for the aluminum foil or the aluminum alloy foil to have a thickness not larger than 50 μm, preferably not larger than 25 μm. Also, it is desirable for the aluminum foil to have a purity not lower than 99%. Further, it is desirable for the aluminum alloy to contain, for example, magnesium, zinc and silicon. On the other hand, it is desirable for the content of the transition metals such as iron, copper, nickel and chromium in the aluminum alloy to be not higher than 1%.

2) Nonaqueous Electrolyte

This nonaqueous electrolyte contains a nonaqueous solvent and an electrolyte salt to be dissolved in this nonaqueous solvent. Also, a polymer may be contained in the nonaqueous solvent.

Examples of the electrolyte salt include lithium salts such as $LiPF_6$, $LiBF_4$, $Li(CF_3SO_2)_2N$ (bistrifluoromethanesulfonylamide lithium (popular name: LiTFSI)), $LiCF_3SO_3$ (popular name: LiTFS), $Li(C_2F_5SO_2)_2N$ (bispentafluoroethanesulfonylamide lithium (popular name: LiBETI)), $LiClO_4$, $LiAsF_6$, $LiSbF_6$, lithium bis-oxalatoborate ($LiB(C_2O_4)_2$ (popular name: LiBOB)) and difluoro(trifluoro-2-oxide-2-trifluoro-methylpropionate(2-)-0,0) lithium borate ($LiBF_2(OCOOC(CF_3)_2)$ (popular name: $LiBF_2$(HHIB))). These electrolyte salts may be used either singly or in combination of two or more. Particularly, $LiPF_6$ and $LiBF_4$ are preferable.

Here, the concentration of the electrolyte salt is preferably in the range of 1.5 to 3M.

Examples of the nonaqueous solvent include, though not particularly limited to, propylene carbonate (PC), ethylene carbonate (EC), 1,2-dimethoxyethane (DME), γ-butyrolactone (GBL), tetrahydrofuran (THF), 2-methyltetrahydrofuran (2-MeHF), 1,3-dioxolan, sulfolane, acetonitrile (AN), diethyl carbonate (DEC), dimethyl carbonate (DMC), methylethyl carbonate (MEC) and dipropyl carbonate (DPC). These solvents may be used either singly or in combination of two or more. Among these solvents, γ-butyrolactone is preferable. Also, when two or more solvents are combined, these solvents are all preferably selected from those having a dielectric constant of 20 or more.

Additives may be added to this nonaqueous electrolyte. Examples of these additives include, though not particularly limited to, vinylene carbonate (VC), vinylene acetate (VA), vinylene butylate, vinylene hexonate, vinylene crotonate and catechol carbonate. The concentration of the additives is preferably in the range of 0.1 to 3 wt % with respect to 100 wt % of the nonaqueous electrolyte. A more preferable range is 0.5 to 1 wt %.

The structure of the nonaqueous electrolyte battery according to the first embodiment is not particularly restricted, and may be various structures such as a flat structure, a rectangular structure and a cylindrical structure. An example of the flat nonaqueous electrolyte battery is shown in FIGS. 2 to 4.

As shown in FIG. 2, an electrode group 1 has a structure in which a positive electrode 2 and a negative electrode 3 are coiled in a flat shape with interposition of a separator 4 between the electrodes. The electrode group 1 is manufactured by applying hot-press after coiling the positive electrode 2 and negative electrode 3 with interposition of the separator 4 therebetween. The positive electrode 2, negative electrode 3 and separator 4 in the electrode group 1 may be integrated with an adhesive polymer. A belt-like positive electrode terminal 5 is electrically connected to the positive electrode 2, while a belt-like negative electrode terminal 6 is electrically connected to the negative electrode 3. The electrode group 1 is housed in a laminate film case 7 having heat-seal portions on three edges as an outer package member. The tips of the positive electrode terminal 5 and negative electrode terminal 6 are pulled out from the shorter edge of the heat seal portion of the case 7.

While the tips of the positive electrode terminal 5 and negative electrode terminal 6 are pulled out from the same heat seal portion of the case 7 as shown in FIG. 2, the heat seal portion from which the positive electrode terminal 5 is pulled out may be different from the heat seal portion from which the negative electrode terminal 6 is pulled out. A specific example of the structure is shown in FIGS. 3 and 4.

Figure 3:
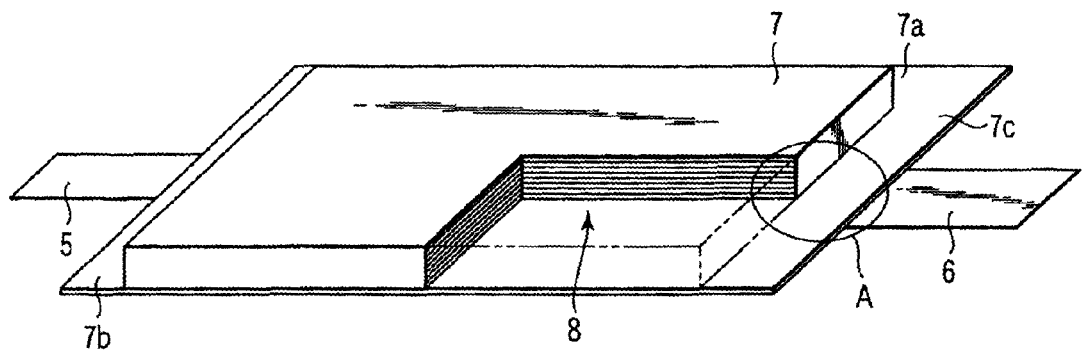
FIG. 3 is a partially broken perspective view showing another nonaqueous electrolyte battery according to the first embodiment.
Figure 4:
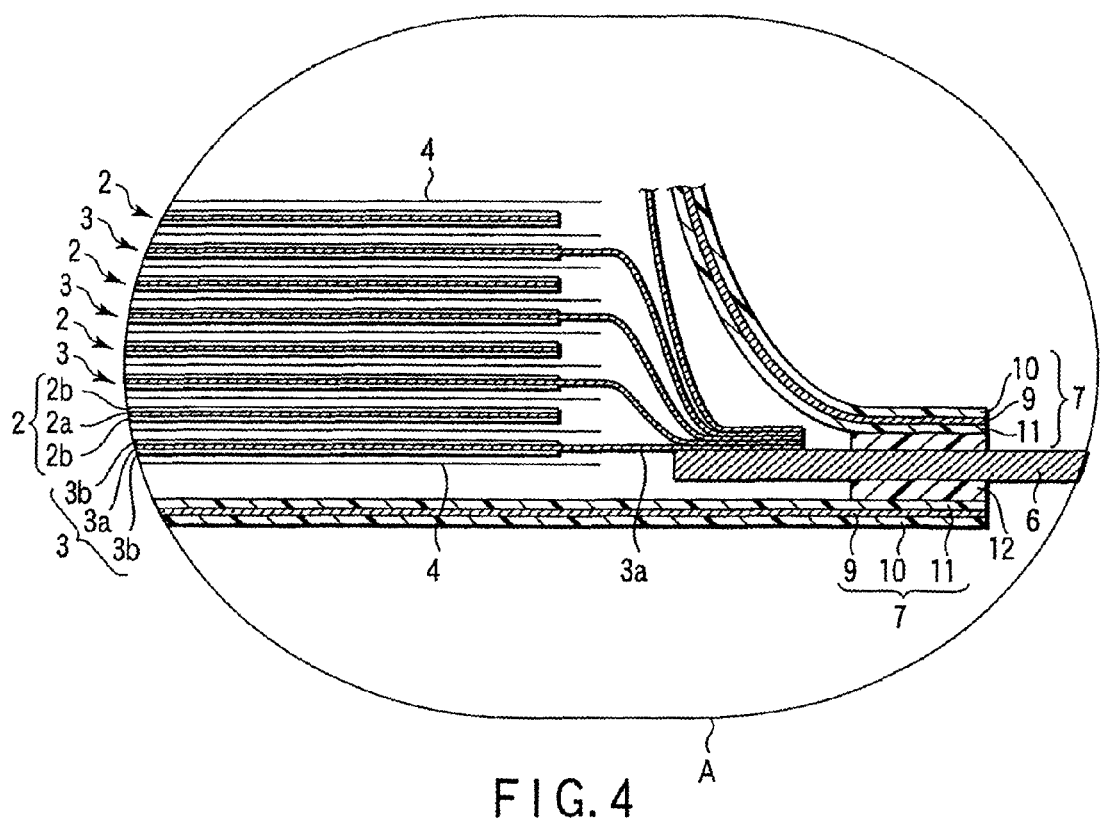
FIG. 4 is a pattern diagram of an enlarged section of the part shown by A in the nonaqueous electrolyte battery shown in FIG. 3.

As shown in FIG. 3, a laminated electrode group 8 is housed in the case 7 made of the laminate film. As show in FIG. 4, the laminate film comprises, for example, a resin layer 10, a thermoplastic resin layer 11, and a metal layer 9 disposed between the resin layer 10 and thermoplastic resin layer 11. The thermoplastic resin layer 11 is located on the inner surface of the case 7. Heat-seal portions 7a, 7b and 7c are formed by thermal adhesion of the thermoplastic resin layer 11 at one longer edge and both shorter edges of the case 7 made of the laminate film. The case 7 is sealed with the heat-seal portions 7a, 7b and 7c. The laminated electrode group 8 has a structure in which the positive electrodes 2 and negative electrodes 3 are alternately laminated with interposition of the separators 4 between them. Plural positive electrodes 2 are used, and each electrode comprises a positive electrode current collector 2a and positive electrode active material-containing layers 2b laminated on both surfaces of the positive electrode current collector 2a. Plural negative electrodes 3 are used, and each electrode comprises a negative electrode current collector 3a and negative electrode active material-containing layers 3b laminated on both surfaces of the negative electrode current collector 3a. One edge of the negative electrode current collector 3a of the negative electrode 3 is protruded out of the positive electrode 2. The negative electrode current collector 3a protruded out of the positive electrode 2 is electrically connected to the belt-like negative electrode terminal 6. The tip of the belt-like negative electrode terminal 6 is pulled out to the outside through the heat seal portion 7c of the case 7. Both surfaces of the negative electrode terminal 6 are opposed to the thermoplastic resin layers 11 that constitute the heat seal portion 7c. An insulation film 12 is inserted between each surface of the negative electrode terminal 6 and the thermoplastic resin layer 11 for improving the bonding strength between the heat seal portion 7c and the negative electrode terminal 6. An example of the insulation film 12 is a film formed of a material prepared by adding an acid anhydride to a polyolefin that contains at least one of polypropylene and polyethylene. The edge of the positive electrode current collector 2a of the positive electrode 2 is protruded out of the negative electrode 3, although this configuration is not illustrated in the drawing. The edge of the positive electrode current collector 2a is positioned at an opposed side to the protruded edge of the negative electrode current collector 3a. The positive electrode current collector 2a protruded out of the negative electrode 3 is electrically connected to the belt-like positive electrode terminal 5. The tip of the belt-like positive electrode terminal 5 is pulled out through the heat seal portion 7b of the case 7. The insulation film 12 is interposed between the positive electrode terminal 5 and the thermoplastic resin layer 11 for improving bonding strength between the heat seal portion 7b and the positive electrode terminal 5. The direction in which the positive electrode terminal 5 is pulled out of the case 7 is opposed to the direction in which the negative electrode terminal 6 is pulled out of the case 7, as is evident from the above-described construction.

As shown in FIGS. 3 and 4, a nonaqueous electrolyte battery favorable for use under a large load current may be provided by providing the pull-out direction of the positive electrode terminal 5 so as to be opposed to the pull-out direction of the negative electrode terminal 6.

Figure 5:
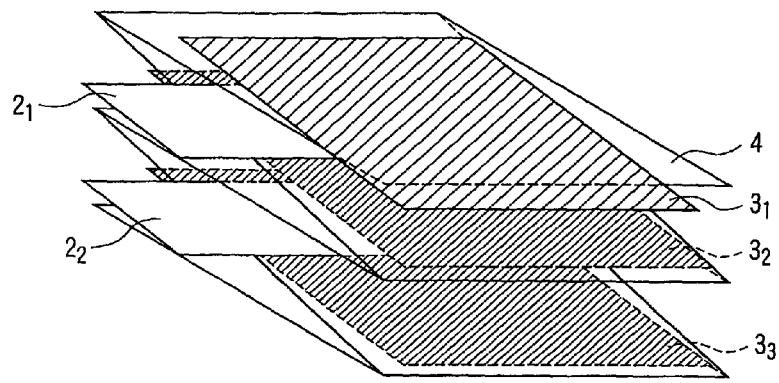
FIG. 5 is a perspective view showing a typical electrode group having a laminate structure used in a nonaqueous electrolyte battery according to the first embodiment.

Examples of the structure of the electrode group include a coil structure, as shown in FIG. 1 mentioned above, and a laminate structure as shown in FIGS. 3 and 4 mentioned above. In the laminate structure, the separator may be folded in a zigzag shape in use, as shown in FIG. 5. A band-shaped separator 4 is folded in a zigzag shape. A negative electrode $3_1$ strip is laminated on the top layer of the separator 4 folded in a zigzag shape. A positive electrode $2_1$ strip, a negative electrode $3_2$ strip, a positive electrode $2_2$ strip and a negative electrode $3_3$ strip are each inserted in this order from above into a part where the separators 4 are overlapped on each other. The positive electrodes 2 and the negative electrodes 3 are alternately arranged between the separators 4 piled in a zigzag shape to thereby obtain an electrode group having a laminate structure.

The above separator, positive electrode terminal, negative electrode terminal and outer package member will be explained.

Examples of the material used for the separator may include porous films containing polyethylene, polypropylene, cellulose or polyvinylidene fluoride (PVdF) and synthetic resin nonwoven fabrics. Among these materials, porous films made of polyethylene or polypropylene melt at a fixed temperature to thereby cut off current and are therefore preferable in terms of improving safety. Also, nonwoven fabrics made of cellulose have a high porosity and therefore suppress clogging caused by a resistant component in high-temperature storage.

The positive electrode terminal may be formed from materials having electric stability and conductivity in a potential range of 3V to 5V with respect to a lithium ion metal. Specific examples of the material include aluminum and aluminum alloys containing elements such as Mg, Ti, Zn, Mn, Fe, Cu and Si. It is preferable to use the same material that is used for the positive electrode current collector to reduce the contact resistance.

The negative electrode terminal may be formed from materials having electric stability and conductivity in a potential range of 0.4V to 3V with respect to a lithium ion metal. Specific examples of the material include aluminum and aluminum alloys containing elements such as Mg, Ti, Zn, Mn, Fe, Cu and Si. It is preferable to use the same material that is used for the negative electrode current collector to reduce the contact resistance.

A multilayer film comprising a metal foil covered with a resin film may be used for the laminate film constituting the outer package member. The resin available includes polymer films such as polypropylene (PP), polyethylene (PE), nylon or polyethylene terephthalate (PET). As shown in FIG. 4 above, polypropylene (PP) or polyethylene (PE) may be used as a thermoplastic resin when one of the resin films is formed of the thermoplastic resin. The metal foil can be formed of aluminum or an aluminum alloy. The thickness of the laminate film is desirably 0.2 mm or less.

While the outer package member made of the laminate film is used in FIGS. 2 to 4, the material of the outer package member is not particularly restricted and, for example, a case made of a metal with a thickness of 0.5 mm or less may be used. The metal case available is a rectangular or cylindrical metal can made of aluminum, an aluminum alloy, iron or stainless steel. The thickness of the metal case is desirably 0.2 mm or less.

The aluminum alloy constituting the metal case is preferably an alloy containing elements such as magnesium, zinc and silicon. However, the content of transition metals such as iron, copper, nickel and chromium is preferably 10 or less. This composition permits long term reliability under a high temperature environment and heat dissipating ability to be remarkably improved.

The metal can made of aluminum or an aluminum alloy preferably has an average crystal grain size of 50 µl or less, more preferably 30 µm or less, and further preferably 5 µm or less. The strength of the metal can made of aluminum or an aluminum alloy can be remarkably increased by controlling the average crystal grain size to be 50 µm or less to enable the can to be thin. Consequently, a vehicle-mounted battery that is light weight, shows high output power and is excellent in long term reliability can be realized.

Figure 6:
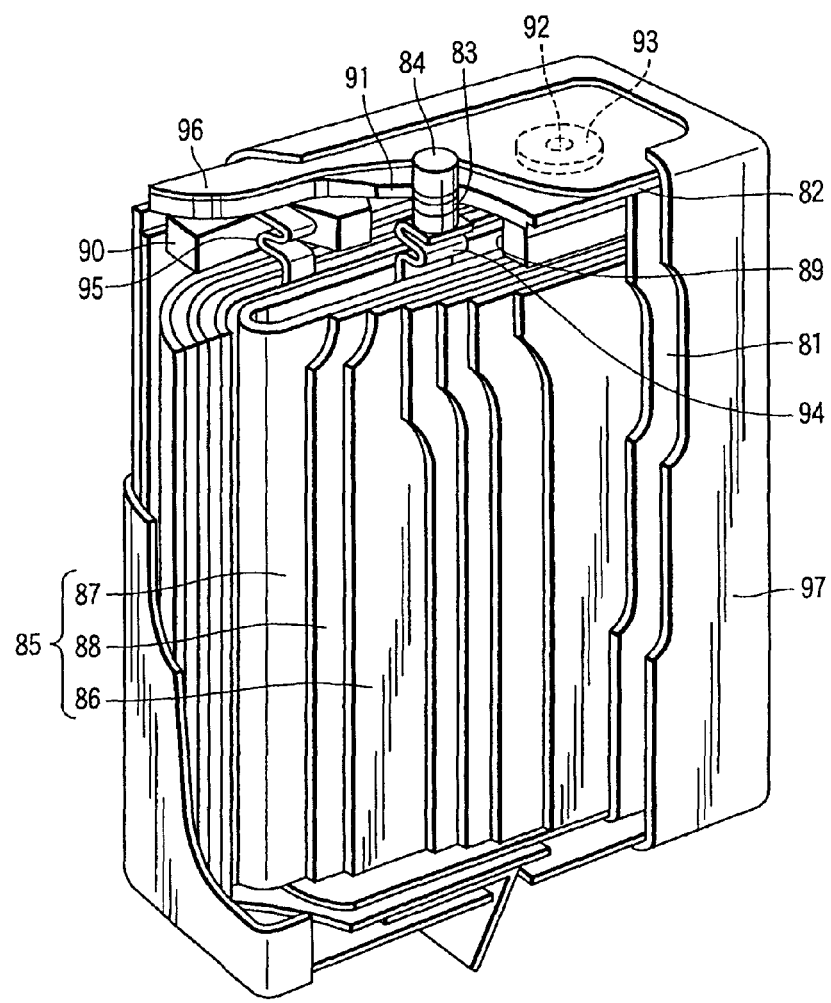
FIG. 6 is a partially broken perspective view showing a nonaqueous electrolyte battery according to the first embodiment.

FIG. 6 shows a nonaqueous electrolyte battery using a metal case according to an embodiment.

The outer package member comprises a case 81 which has a bottomed rectangular cylinder form and is made of aluminum or an aluminum alloy, a lid 82 disposed on an opening part of the case 81 and a negative electrode terminal 84 attached to the lid 82 through an insulating material 83. The case 81 also serves as a positive electrode terminal. As the above aluminum or aluminum alloy constituting the case 81, those having the aforementioned composition and average crystal grain size may be used.

An electrode group 85 is housed in the case 81. The electrode group 85 has a structure in which a positive electrode 86 and a negative electrode 87 are coiled through a separator 88 in a flat form. This electrode group 85 is obtained in the following manner: for example, a band-like product obtained by laminating the positive electrode 86, the separator 88 and the negative electrode 87 in this order is coiled in a spiral form by using a plate or cylindrical core such that the positive electrode 86 is positioned on the outside, and the obtained coiled product is molded under pressure in the radial direction.

The nonaqueous electrolytic solution (liquid nonaqueous electrolyte) is held in the electrode group 85. A spacer 90 which is provided with a lead-takeoff hole 89 in the vicinity of the center thereof and made of, for example, a synthetic resin is disposed on the electrode group 85 in the case 81.

A takeoff hole 91 for the negative electrode terminal 84 is opened in the vicinity of the center of the lid 82. A liquid injection port 92 is formed at a position apart from the takeoff hole 91 of the lid 82. The liquid injection port 92 is sealed with a seal plug 93 after the nonaqueous electrolytic solution is injected into the case 81. The negative electrode terminal 84 is hermetically sealed in the takeoff hole 91 of the lid 82 through a glass or resin insulating material 83.

A negative electrode lead tab 94 is welded to the lower bottom surface of the negative electrode terminal 84. The negative electrode lead tab 94 is electrically connected to the negative electrode 87. One end of a positive electrode lead 95 is electrically connected to the positive electrode 86 and the other end thereof is welded to the lower surface of the lid 82. An insulating paper 96 covers the entire outer surface of the lid 82. An outer package tube 97 covers the entire side surface of the case 81, and the upper and lower ends thereof are folded so as to cover the upper and lower surfaces of the battery body, respectively.

Second Embodiment

A battery pack according to a second embodiment comprises the nonaqueous battery according to the first embodiment. The number of the nonaqueous electrolyte batteries may be two or more. It is desirable that the nonaqueous electrolyte battery according to the first embodiment be used as a unit cell and each unit cell be arranged electrically in series or in parallel to constitute a battery module.

The nonaqueous electrolyte battery according to the first embodiment is suitable for use as a battery module and the battery pack according to the second embodiment is superior in output performance and cycle performance. The reason will be explained.

When the negative electrode is improved in nonaqueous electrolyte impregnation ability and in the uniformity of the distribution of the negative electrode active material, overvoltage is scarcely applied to the negative electrode. As a result, the negative electrode can be prevented from falling into a local overcharge or overdischarge state and it is therefore possible to equalize the utilization factor of the negative electrode active material. This makes it possible to greatly reduce differences in capacity and impedance between unit cells constituting the battery module. Specifically, in the battery module obtained by connecting unit cells in series, a variation in voltage between unit cells in a fully charged state is reduced because any difference in capacities of the unit cells becomes small. Therefore, the battery pack according to the second embodiment is superior in output performance and can be improved in cycle performance.

Figure 8:
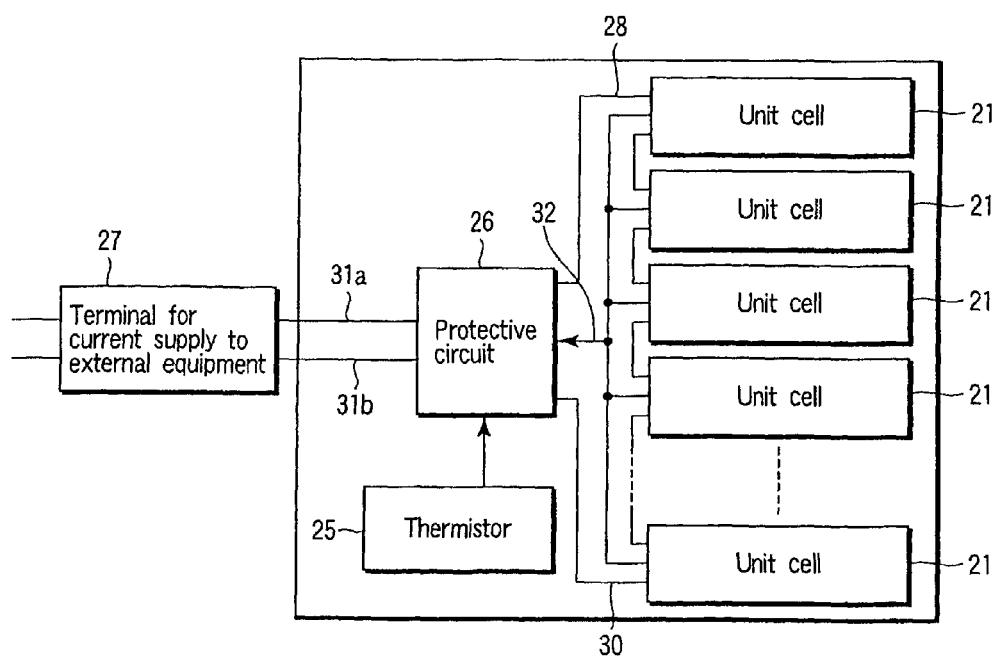
FIG. 8 is a block diagram showing an electric circuit of a battery pack shown in FIG. 7.
Figure 7:
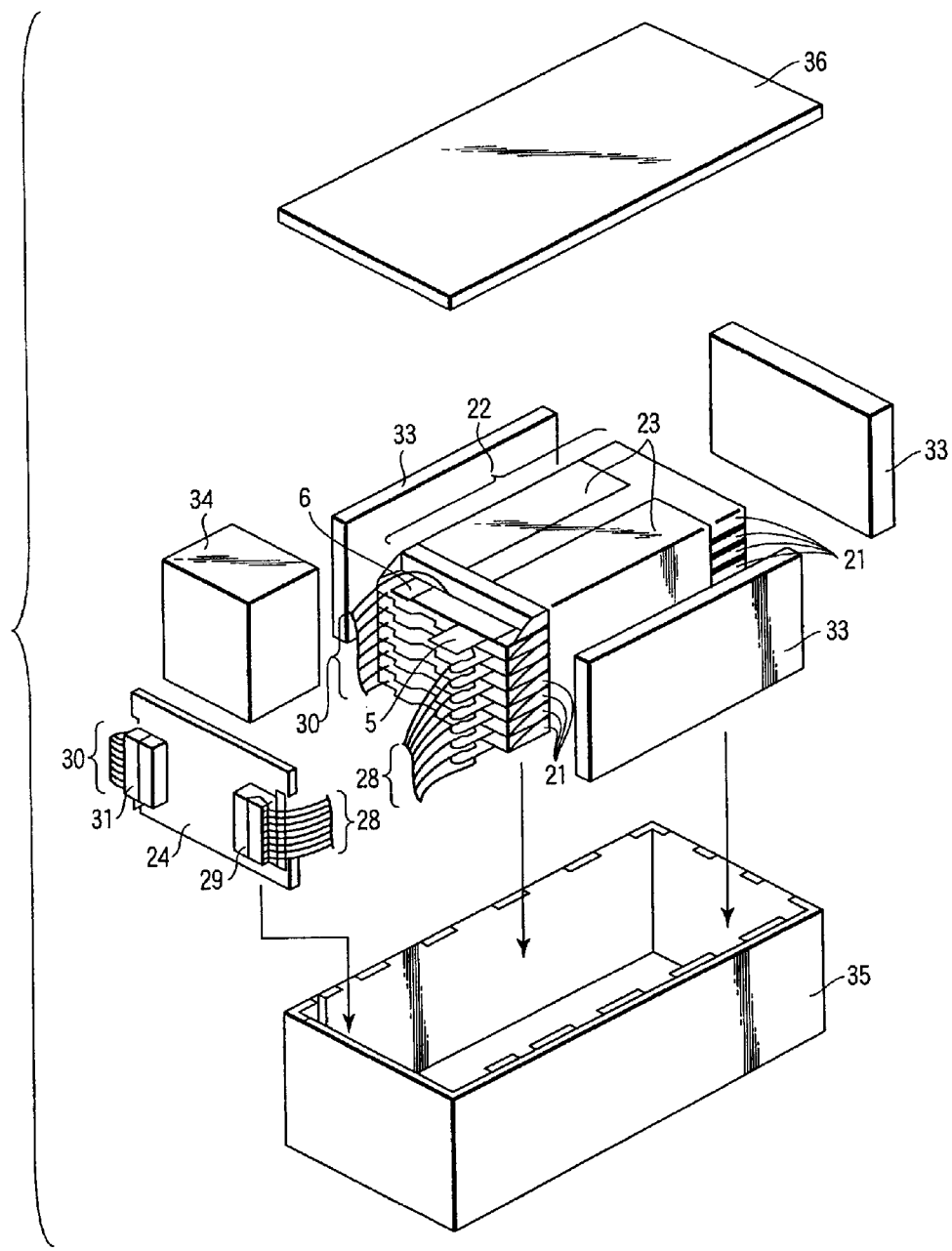
FIG. 7 is an explosion perspective view of a battery pack according to a second embodiment.

Each of a plurality of unit cells 21 included in the battery pack shown in FIG. 7 is formed of, though not limited to, a flattened type nonaqueous electrolyte battery constructed as shown in FIG. 2. It is possible to use the flattened type nonaqueous electrolyte battery shown in FIGS. 3 and 6 as the unit cell 21. The plural unit cells 21 are stacked one upon the other in the thickness direction in a manner to align the protruding directions of the positive electrode terminals 5 and the negative electrode terminals 6. As shown in FIG. 8, the unit cells 21 are connected in series to form a battery module 22. The unit cells 21 forming the battery module 22 are made integral by using an adhesive tape 23 as shown in FIG. 7.

A printed wiring board 24 is arranged on the side surface of the battery module 22 toward which protrude the positive electrode terminals 5 and the negative electrode terminals 6. As shown in FIG. 8, a thermistor 25, a protective circuit 26 and a terminal 27 for current supply to the external equipment are connected to the printed wiring board 24.

As shown in FIGS. 7 and 8, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a prescribed temperature, and that the over-charging, over-discharging and over-current of the unit cell 21 have been detected. The detecting method is applied to the unit cells 21 or to the battery module 22. In the case of applying the detecting method to each of the unit cells 21, it is possible to detect the battery voltage, the positive electrode potential or the negative electrode potential. On the other hand, where the positive electrode potential or the negative electrode potential is detected, lithium metal electrodes used as reference electrodes are inserted into the unit cells 21.

In the case of FIG. 8, a wiring 32 is connected to each of the unit cells 21 for detecting the voltage, and the detection signal is transmitted through these wirings 32 to the protective circuit 26.

Protective sheets 33 each formed of rubber or resin are arranged on the three of the four sides of the battery module 22, though the protective sheet 33 is not arranged on the side toward which protrude the positive electrode terminals 5 and the negative electrode terminals 6. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk to fix the battery module 22.

The unit cells 21 shown in FIGS. 7 and 8 are connected in series. However, it is also possible to connect the unit cells 21 in parallel to increase the cell capacity. Of course, it is possible to connect the battery packs in series and in parallel.

Also, the embodiments of the battery pack can be changed appropriately depending on the use of the battery pack.

The battery pack according to the second embodiment is preferably used when good cycle performance is required at a large load current (high current density). Specifically, the battery pack is used for power sources of digital cameras, vehicle-mounted batteries for two-wheel or four-wheel hybrid electric cars, two-wheel or four-wheel electric cars and electric mopeds, and power sources of rechargeable vacuum cleaners.

Third Embodiment

The vehicle according to the third embodiment comprises the battery pack according to the second embodiment. The vehicle as used herein includes two- to four-wheel hybrid electric cars, from two- to four-wheel electric cars, and motor-assisted bicycles.

Figure 11:
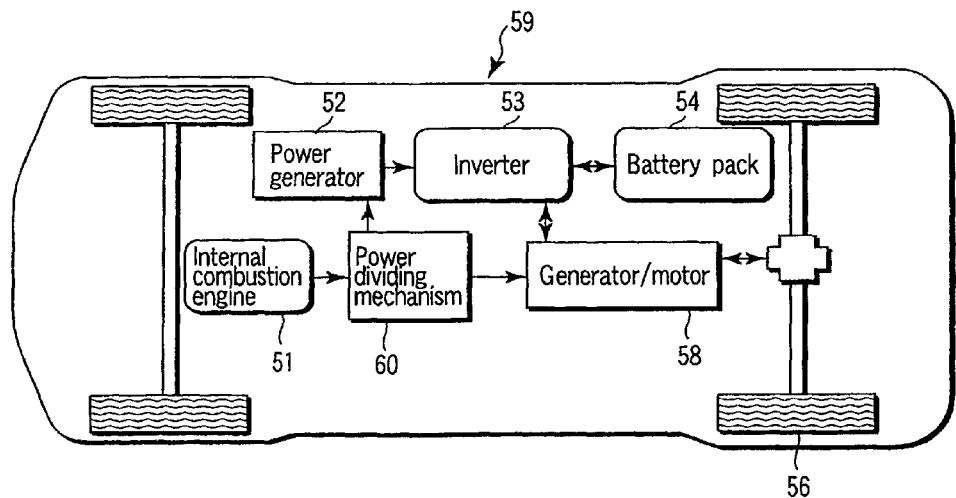
FIG. 11 is a pattern diagram showing a series-parallel hybrid car according to the third embodiment.

FIGS. 9 to 11 show various type of hybrid vehicles in which an internal combustion engine and a motor driven by a battery pack are used in combination as the power source for the driving. The hybrid vehicle can be roughly classified into three types depending on the combination of the internal combustion engine and the electric motor.

FIG. 9 shows a hybrid vehicle 50 that is generally called a series hybrid vehicle. The motive power of an internal combustion engine 51 is once converted entirely into an electric power by a power generator 52, and the electric power thus converted is stored in a battery pack 54 via an inverter 53. The battery pack according to the second embodiment is used as the battery pack 54. The electric power stored in the battery pack 54 is supplied to an electric motor 55 via the inverter 53, with the result that wheels 56 are driven by the electric motor 55. In other words, the hybrid vehicle 50 shown in FIG. 9 represents a system in which a power generator is incorporated into an electric vehicle. The internal combustion engine can be operated under highly efficient conditions and the kinetic energy of the internal combustion engine can be recovered as the electric power. On the other hand, the wheels are driven by the electric motor alone and, thus, the hybrid vehicle 50 requires an electric motor of a high output. It is also necessary to use a battery pack having a relatively large capacity. It is desirable for the rated capacity of the battery pack to fall within a range of 5 to 50 Ah, more desirably 10 to 20 Ah. Incidentally, the rated capacity noted above is the capacity at the time when the battery pack is discharged at a rate of 0.2 C.

FIG. 10 shows the construction of a hybrid vehicle 57 that is called a parallel hybrid vehicle. A reference numeral 58 shown in FIG. 10 denotes an electric motor that also acts as a power generator. The internal combustion engine 51 drives mainly the wheels 56. The motive power of the internal combustion engine 51 is converted in some cases into an electric power by the power generator 58, and the battery pack 54 is charged by the electric power produced from the power generator 58. In the starting stage or the accelerating stage at which the load is increased, the driving force is supplemented by the electric motor 58. The hybrid vehicle 57 shown in FIG. 10 represents a system based on the ordinary vehicle. In this system, the fluctuation in the load of the internal combustion engine 51 is suppressed so as to improve the efficiency, and the regenerative power is also obtained. Since the wheels 56 are driven mainly by the internal combustion engine 51, the output of the electric motor 58 can be determined arbitrarily depending on the required ratio of the assistance. The system can be constructed even in the case of using a relatively small electric motor 58 and a relatively small battery pack 54. The rated capacity of the battery pack can be set to fall within a range of 1 to 20 Ah, more desirably 3 to 10 Ah.

FIG. 11 shows the construction of a hybrid vehicle 59 that is called a series-parallel hybrid vehicle, which utilizes in combination both the series type system and the parallel type system. A power dividing mechanism 60 included in the hybrid vehicle 59 divides the output of the internal combustion engine 51 into the energy for the power generation and the energy for the wheel driving. The series-parallel hybrid vehicle 59 permits controlling the load of the engine more finely than the parallel hybrid vehicle so as to improve the energy efficiency.

It is desirable for the rated capacity of the battery pack to fall within a range of 1 to 20 Ah, more desirably 3 to 10 Ah.

It is desirable for the nominal voltage of the battery pack included in the hybrid vehicles as shown in FIGS. 9 to 11 to fall within a range of 200 to 600V.

Figure 12:
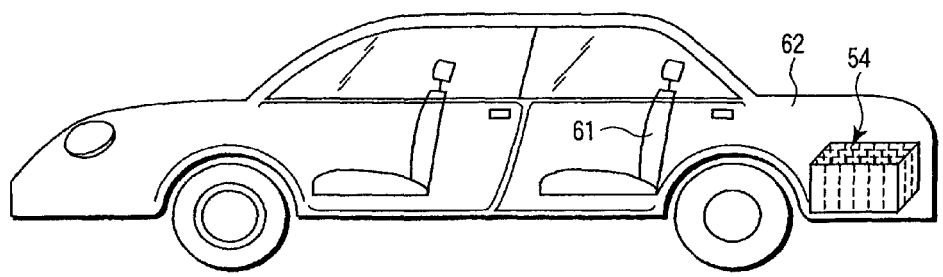
FIG. 12 is a pattern diagram showing a car according to the third embodiment.

It is desirable for the battery pack 54 to be arranged in general in the site where the battery pack 54 is unlikely to be affected by the change in the temperature of the outer atmosphere and unlikely to receive an impact in the event of a collision. In, for example, a sedan type automobile shown in FIG. 12, the battery pack 54 can be arranged within a trunk room rearward of a rear seat 61. The battery pack 54 can also be arranged below or behind the rear seat 61. Where the battery has a large weight, it is desirable to arrange the battery pack 54 below the seat or below the floor in order to lower the center of gravity of the automobile.

An electric vehicle (EV) is driven by the energy stored in the battery pack that is charged by the electric power supplied from outside the vehicle. Since all the power required for the driving of the vehicle is produced by an electric motor, it is necessary to use an electric motor of a high output. In general, it is necessary to store all the energy required for one driving in the battery pack by one charging. It follows that it is necessary to use a battery pack having a very large capacity. It is desirable for the rated capacity of the battery pack to fall within a range of 100 to 500 Ah, more desirably 200 to 400 Ah.

The weight of the battery pack occupies a large ratio of the weight of the vehicle. Therefore, it is desirable for the battery pack to be arranged in a low position that is not markedly apart from the center of gravity of the vehicle. For example, it is desirable for the battery pack to be arranged below the floor of the vehicle. In order to allow the battery pack to be charged in a short time with a large amount of the electric power required for the one driving, it is necessary to use a charger of a large capacity and a charging cable. Therefore, it is desirable for the electric vehicle to be equipped with a charging connector connecting the charger and the charging cable. A connector utilizing the electric contact can be used as the charging connector. It is also possible to use a non-contact type charging connector utilizing the inductive coupling.

Figure 13:
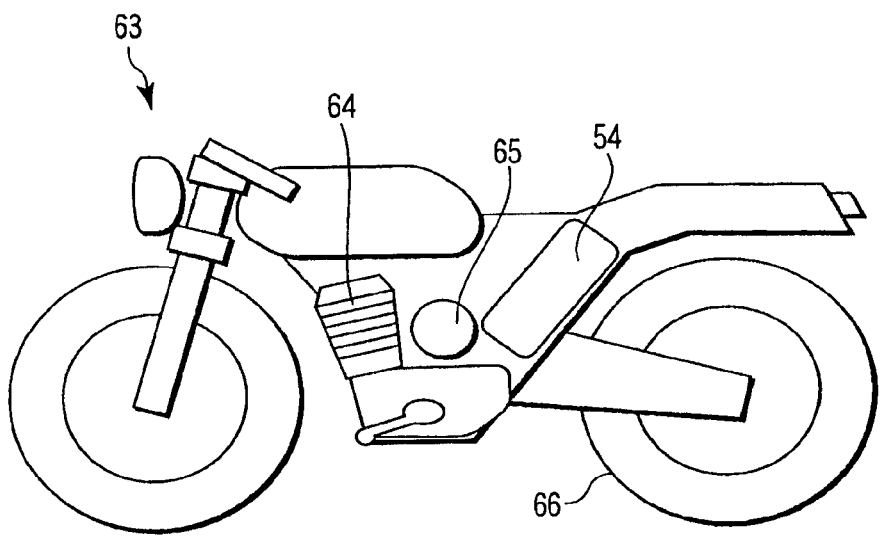
FIG. 13 is a pattern diagram showing a hybrid motorcycle according to the third embodiment.

FIG. 13 exemplifies the construction of a hybrid motor bicycle 63. It is possible to construct a hybrid motor bicycle 63 exhibiting a high energy efficiency and equipped with an internal combustion engine 64, an electric motor 65, and the battery pack 54 like the hybrid vehicle. The internal combustion engine 64 drives mainly the wheels 66. In some cases, the battery pack 54 is charged by utilizing a part of the motive power generated from the internal combustion engine 64. In the starting stage or the accelerating stage in which the load of the motor bicycle is increased, the driving force of the motor bicycle is supplemented by the electric motor 65. Since the wheels 66 are driven mainly by the internal combustion engine 64, the output of the electric motor 65 can be determined arbitrarily based on the required ratio of the supplement. The electric motor 65 and the battery pack 54, which are relatively small, can be used for constructing the system. It is desirable for the rated capacity of the battery pack to fall within a range of 1 to 20 Ah, more desirably 3 to 10 Ah.

Figure 14:
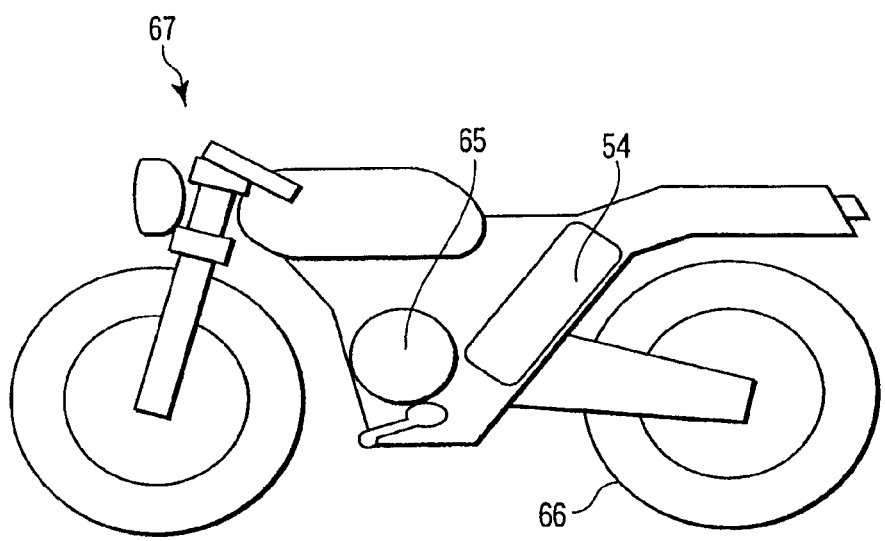
FIG. 14 is a pattern diagram showing an electric motorcycle according to the third embodiment.

FIG. 14 exemplifies the construction of an electric motor bicycle 67. The electric motor bicycle 67 is driven by the energy stored in the battery pack 54 that is charged by the supply of the electric power from the outside. Since all the driving force required for the driving the motor bicycle 67 is generated from the electric motor 65, it is necessary to use the electric motor 65 of a high output. Also, since it is necessary for the battery pack to store all the energy required for one driving by one charging, it is necessary to use a battery pack having a relatively large capacity. It is desirable for the rated capacity of the battery pack to fall within a range of 10 to 50 Ah, more desirably 15 to 30 Ah.

Fourth Embodiment

FIGS. 15 and 16 show an example of a rechargeable vacuum cleaner according to a fourth embodiment. The rechargeable vacuum cleaner comprises an operating panel 75 which selects operation modes, an electrically driven blower 74 comprising a fun motor for generating suction power for dust collection, and a control circuit 73. A battery pack 72 according to the second embodiment as a power source for driving these units are housed in a casing 70. When the battery pack is housed in such a portable device, the battery pack is desirably fixed with interposition of a buffer material in order to prevent the battery pack from being affected by vibration. Known technologies may be applied for maintaining the battery pack at an appropriate temperature. While a battery charger 71 that also serves as a setting table functions as the battery charger of the battery pack according to the second embodiment, a part or all of the function of the battery charger may be housed in the casing 70.

While the rechargeable vacuum cleaner consumes a large electric power, the rated capacity of the battery pack is desirably in the range of 2 to 10 Ah, more preferably 2 to 4 Ah, in terms of portability and operation time. The nominal voltage of the battery pack is desirably in the range of 40 to 80V.

The present invention will be explained in detail by way of examples with reference to the drawings.

Example 1

Production of a Positive Electrode $LiCoO_2$ was used as a positive electrode active material, to which were added a graphite powder as a conductive agent in an amount of 8% by weight based on the total amount of the positive electrode and PVdF as a binder in an amount of 5% by weight based on the total amount of the positive electrode. These components were dispersed in an n-methylpyrrolidone (NMP) solvent to prepare a slurry. The obtained slurry was applied to a 15-μm-thick aluminum foil, which was then treated through drying and pressing processes to manufacture a positive electrode having an electrode density of 3.3 g/cm$^3$.

<Production of a Negative Electrode>

$Li_4Ti_5O_{12}$ particles having a spinel structure and an average particle diameter of 0.9 μm were prepared as a negative electrode active material. To this negative electrode active material were added graphite as a conductive agent in an amount of 10% by weight based on the total amount of the negative electrode, and PVdF as a binder in an amount of 3% by weight based on the total amount of the negative electrode. These components were dispersed in an n-methylpyrrolidone (NMP) solvent to prepare a slurry. The slurry was kneaded at 5° C. for 18 hours. Furthermore, the kneaded slurry was subjected to a beads mill process with a 1.7 L vessel to carry out circulation operation at a flow rate of 3 L/min for 30 minutes. When the capacity of the vessel is A (L), the flow rate corresponds to 1.8 A (L). At this time, 0.3 mmφ zirconia beads were used. When the slurry as the product to be treated is made to pass through the beads mill using small-diameter beads at a large flow rate, that is, when the retention time during which the slurry is made to pass one time through the vessel imparting a small impact is shortened, only a soft shearing force is applied to the slurry, making it possible to loosen the coagulation of primary particles without any influence on the shape and crystallinity of the $Li_4Ti_5O_{12}$ particles. Then, the obtained slurry was applied to a current collector made of an aluminum foil 15 μm in thickness and dried, followed by pressing, to produce a negative electrode having an electrode density of 2.1 g/cm$^3$.

The distribution of pore size diameter of the obtained negative electrode was measured by mercury porosimetry and as a result, the specific surface area of pores calculated based on the weight of the negative electrode, excluding the weight of the negative electrode current collector, was 8.7 m$^2$/g. The total pore volume per 1 g of the negative electrode excluding the negative electrode current collector was 0.1521 mL/g. The volume of pores having a diameter of 0.05 μm or less per 1 g of the negative electrode excluding the negative electrode current collector was 0.033 mL/g. Accordingly, the ratio of the volume of pores having a pore size diameter of 0.05 μm or less to the total pore volume was 21.70%. Also, the log differential intrusion curve had a peak at a pore size diameter of 0.085 μm. Also, the above curve attenuated with a decrease in pore size diameter from the apex present at a pore size diameter of 0.085 μm.

<Preparation of a Nonaqueous Electrolyte>

2M of $LiBF_4$ was mixed in a mixture solvent prepared by blending EC, PC and GBL in a ratio by volume of 1:1:4 to make a nonaqueous electrolyte.

<Fabrication of a Battery>

A separator made of a polyethylene porous film was impregnated with the nonaqueous electrolyte. The positive electrode was coated with this separator. The negative electrode was overlapped on the positive electrode with the separator therebetween, and the electrodes and separator were coiled into a spiral form to manufacture a spiral electrode group. This electrode group was pressed into a flat form. The flattened electrode group was inserted into a can-shaped case made of aluminum 0.3 mm in thickness to manufacture a 3.0-mm-thick, 35-mm-wide and 62-mm-high flat-type nonaqueous electrolyte battery shown in FIG. 6.

After the obtained battery was charged up to 50% of the rated value, it was discharged under 1 C for 10 seconds. Thereafter, the battery was recharged up to 50% of the rated value and then, it was discharged under 5 C for 10 seconds. The current value when the voltage of the battery reached 1.5V was found from the cutoff voltage in the 1 C discharge operation and from the cutoff voltage in the 5 C discharge operation by extrapolation. The power calculated from the current value at 1.5V, that is, the maximum power among powers applied for 10 seconds was 150W.

The log differential intrusion curve and cumulative pore intrusion curve, which showed the pore size diameter distribution of the negative electrode measured by mercury porosimetry, were measured using the methods described below.

An Autopore 9520 model, manufactured by Shimadzu Corporation, was used as the measuring device. The negative electrode was cut into a size of 25×25 mm$^2$ to prepare a sample, which was then folded and placed in a measuring cell for measurement under the condition of an initial pressure of 20 kPa which corresponds to about 3 psia and also to a pressure applied to a sample having a pore size diameter of about 60 μm. An average of three samples was used as the result of measurement. In the adjustment of data, the specific surface area of pores was calculated on the premise that the pore had a cylindrical form. When the apex of a peak was present in a pore size diameter range of 0.03 μm to 0.2 μm in the log differential intrusion curve, the presence of the peak in this range was recognized.

It should be noted that the analytical principle of the mercury porosimetry is based on Washburn's equation (B):

$$D = -4\gamma \cos \theta / P \qquad \text{Equation (B)}$$

Here, P is a pressure to be applied, D is a pore size diameter, γ is the surface tension of mercury and is 480 dyne·cm$^{-1}$, and θ is a contact angle of mercury with the wall surface of pores and is 140°. γ and θ are constants and therefore, the relation between the applied pressure P and the pore size diameter D is found from Washburn's equation. If mercury penetration volume at this time is measured, the pore size diameter and its volumetric distribution can be found. As to the details of measuring method, principle and the like, please refer to, for example, Motoji Zimpo et al., "Microparticle Handbook" Asakura Shoten, (1991) and Sohachiro Hayakawa, "Powder Property Measuring Method", Asakura Shoten (1978).

Examples 2 to 9 and Comparative Example 1

A battery was manufactured in the same manner as in Example 1 except that the flow rate when the negative electrode slurry was circulated and the diameter of the beads were altered to those shown in the following Table 1 and a negative electrode was used which had the value shown in Table 1 as the result of measurement using mercury porosimetry.

Example 10

A battery was produced in the same manner as in Example 1 except that $Li_2Ti_3O_7$ particles having an average particle diameter of 0.5 μm were used as the negative electrode active material.

Comparative Example 2

To the same negative electrode active material explained in Example 1 was added graphite as a conductive agent in an amount of 10% by weight based on the total amount of the negative electrode, and PVdF as a binder in an amount of 3% by weight based on the total amount of the negative electrode. These components were dispersed in an n-methylpyrrolidone (NMP) solvent to prepare a slurry. The slurry was kneaded and then, the kneaded slurry was subjected to a beads mill process using zirconia beads having a diameter of 1 mmφ to retain the slurry there for 60 minutes, thereby applying a sufficient load on the slurry to disperse the slurry. Then, the obtained slurry was applied to a current collector made of an aluminum foil of 15 μm in thickness and dried, followed by pressing, to produce a negative electrode having an electrode density of 2.1 g/cm$^3$.

The pore size diameter distribution of the obtained negative electrode was measured by mercury porosimetry and as a result, the specific surface area of pores was 7.5 m$^2$/g. The total pore volume was 0.1734 mL/g. The volume of pores having a diameter of 0.05 μm or less was 0.021 mL/g. Also, the log differential intrusion curve had a peak at a pore size diameter of 0.083 μm. Also, the value of the log differential intrusion decreased with a decrease in pore size diameter from the apex present at a pore size diameter of 0.083 μm, but began increasing at a pore size diameter of 0.02 μm to confirm a small peak having an apex at a pore size diameter of 0.014 μm.

The power of each battery is shown in Table 1.

TABLE 1

|  | Flow rate (L/min) | Diameter of beads (μm) | Residence time in the beads mill (min) | Peak top pore size diameter (μm) | Specific surface area of pores (m²/g) | Total pore volume (A) (mL/g) | Volume (B) of pores having a pore size diameter of 0.05 μm or less (mL/g) | Ratio of B to A (%) | Power value (W) |
|---|---|---|---|---|---|---|---|---|---|
| Example 1 | 3(1.8 A) | 0.3 | 30 | 0.085 | 8.7 | 0.1521 | 0.033 | 21.70 | 150 |
| Example 2 | 3(1.8 A) | 0.3 | 30 | 0.071 | 25.0 | 0.2234 | 0.0814 | 36.44 | 180 |
| Example 3 | 3(1.8 A) | 0.3 | 30 | 0.055 | 100.0 | 0.4812 | 0.1753 | 36.43 | 230 |
| Example 4 | 3(1.8 A) | 0.3 | 30 | 0.081 | 8.5 | 0.1000 | 0.0397 | 39.70 | 130 |
| Example 5 | 3(1.8 A) | 0.3 | 30 | 0.080 | 9.1 | 0.5000 | 0.1550 | 31.00 | 170 |
| Example 6 | 3(1.8 A) | 0.3 | 30 | 0.03 | 95.0 | 0.4283 | 0.3776 | 88.16 | 380 |
| Example 7 | 3(1.8 A) | 0.3 | 30 | 0.2 | 6.2 | 0.1208 | 0.025 | 20.70 | 110 |
| Example 8 | 3(1.8 A) | 0.3 | 30 | 0.102 | 6.0 | 0.1355 | 0.028 | 20.66 | 120 |
| Example 9 | 3(1.8 A) | 0.3 | 30 | 0.085 | 8.6 | 0.1520 | 0.0304 | 20 | 130 |
| Example 10 | 3(1.8 A) | 0.3 | 30 | 0.072 | 12.5 | 0.1933 | 0.064 | 33.11 | 175 |
| Comparative Example 1 | 0.2(0.12 A) | 0.5 | 30 | 0.084 | 8.3 | 0.1633 | 0.0210 | 12.86 | 75 |
| Comparative Example 2 | — | 1 | 60 | 0.083 | 7.5 | 0.1734 | 0.021 | 12.11 | 95 |

As is clear from Table 1, it is understood that each battery obtained in Examples 1 to 10 using a negative electrode satisfying the above conditions (1) to (4) is increased in the maximum power obtained by outputting power for 10 seconds over that of each battery obtained in Comparative Examples 1 and 2. The battery of Comparative Example 1 fails to fulfill the condition (3). Since the ratio of the volume of pores having a pore size diameter of 0.05 μm or less to the total pore volume was less than 20%, the maximum power was low. Also, in the case of the negative electrode obtained in Comparative Example 2, the diameter of the beads was increased to stir the slurry strongly and therefore, the surface of primary particles of $Li_4Ti_5O_{12}$ was scraped, with the result that a second peak appeared at a pore size diameter smaller than that at which the apex of the peak was present in the log differential intrusion curve. Also, the ratio of the volume of pores having a pore size diameter of 0.05 μm or less to the total pore volume was less than 20%. Such a negative electrode was inferior in the uniformity of the distribution of the negative electrode active material and was therefore reduced in the maximum power.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery comprising:
a positive electrode;
a negative electrode containing a lithium compound and a negative electrode current collector, and the negative electrode current collector supporting the lithium compound and comprising at least one kind of material selected from the group consisting of aluminum and aluminum alloys containing at least one kind of element selected from the group consisting of Mg, Ti, Zn, Mn, Fe, Cu and Si; and
a nonaqueous electrolyte,
wherein a log differential intrusion curve obtained when a pore size diameter of the negative electrode is measured by mercury porosimetry has a peak in a pore size diameter range of 0.03 to 0.2 μm and attenuates with a decrease in pore size diameter from an apex of the peak,
a specific surface area (excluding a weight of the negative electrode current collector) of pores of the negative electrode found by mercury porosimetry is 6 to 100 m²/g, and
a ratio of a volume of pores having a pore size diameter of 0.05 μm or less to a total pore volume is 20% or more.

2. The nonaqueous electrolyte battery according to claim 1, wherein a volume of pores measured by the mercury porosimetry is 0.1 to 0.5 mL per 1 g of the negative electrode, excluding the negative electrode current collector.

3. The nonaqueous electrolyte battery according to claim 1, wherein the lithium compound includes lithium-titanium oxide.

4. The nonaqueous electrolyte battery according to claim 3, wherein the lithium-titanium oxide has a spinel structure or a ramsdellite structure.

5. The nonaqueous electrolyte battery according to claim 1, wherein the peak exists in a pore size diameter range of 0.04 to 0.1 μm.

6. The nonaqueous electrolyte battery according to claim 1, wherein the ratio is 20 to 90%.

7. A battery pack comprising the nonaqueous electrolyte battery according to claim 1.

8. A vehicle comprising the nonaqueous electrolyte battery according to claim 1.

9. A nonaqueous electrolyte battery comprising:
a positive electrode comprising at least one kind of oxide selected from the group consisting of manganese dioxide, iron oxide, copper oxide, nickel oxide, lithium-manganese composite oxide, lithium-nickel composite oxide, lithium-cobalt composite oxide, lithium-nickel-cobalt composite oxide, lithium-manganese-cobalt composite oxide, lithium-manganese-nickel composite oxide, spinel-type lithium-manganese-nickel composite oxide, lithium phosphates having an olivine structure, iron sulfate and vanadium oxide;
a negative electrode containing a lithium compound and a negative electrode current collector supporting the lithium compound; and
a nonaqueous electrolyte,
wherein a log differential intrusion curve obtained when a pore size diameter of the negative electrode is measured by mercury porosimetry has a peak in a pore size diameter range of 0.03 to 0.2 μm and attenuates with a decrease in pore size diameter from an apex of the peak, a specific surface area (excluding a weight of the negative electrode current collector) of pores of the negative electrode found by mercury porosimetry is 6 to 100 m$^2$/g, and a ratio of a volume of pores having a pore size diameter of 0.05 μm or less to a total pore volume is 20% or more.

10. The nonaqueous electrolyte battery according to claim 9, wherein a volume of pores measured by the mercury porosimetry is 0.1 to 0.5 mL per 1 g of the negative electrode, excluding the negative electrode current collector.

11. The nonaqueous electrolyte battery according to claim 9, wherein the lithium compound includes lithium-titanium oxide.

12. The nonaqueous electrolyte battery according to claim 11, wherein the lithium-titanium oxide has a spinel structure or a ramsdellite structure.

13. The nonaqueous electrolyte battery according to claim 9, wherein the peak exists in a pore size diameter range of 0.04 to 0.1 μm.

14. The nonaqueous electrolyte battery according to claim 9, wherein the ratio is 20 to 90%.

15. A battery pack comprising the nonaqueous electrolyte battery according to claim 9.

16. A vehicle comprising the nonaqueous electrolyte battery according to claim 9.

* * * * *